United States Patent Office 3,833,561
Patented Sept. 3, 1974

3,833,561
METHOD FOR THE PREPARATION OF CARBOXYL GROUP CONTAINING 6-AMINO-PENICILLANIC ACID DERIVATIVES
Magda Huhn, Geza Toth, Gabor Resofszki, Eva Somfai, and Gabor Horvath, Budapest, Hungary, assignors to Chinoin Gyogyszer- es Vegyeszeti Termekek Gyara RT, Budapest, Hungary
No Drawing. Filed Aug. 17, 1971, Ser. No. 172,551
Claims priority, application Hungary, Aug. 18, 1970, CI-1,026
Int. Cl. C07d 99/16
U.S. Cl. 260—239.1      6 Claims

ABSTRACT OF THE DISCLOSURE

A method of making α-carboxy benzylpenicillin and chlorobenzylpenicillin and like penicillin derivatives especially as the disodium salts, wherein α-amino benzylpenicillin or 6-APA is reacted in weak base or water and the disodium salt is thereupon obtained.

---

It is known that those penicillin derivatives in which the group acylating 6-amino-penicillanic acid (6-APA) also contains a free carboxylic group, as well as the salts of these compounds can be successfully applied in therapy to combat both Gram negative and Gram positive bacterial infections, and that certain members of this group of compounds, such as α-carboxyl-benzylpenicillin sodium have been found to be highly efficient against microorganisms of the Pseudomonase group (Lancet, 1967, p. 1289).

The therapeutically applied salts of these compounds include the sodium, potassium, calcium, aluminum, ammonium or substituted ammonium salts, thus nontoxic amines and trialkylamines, such as triethylamine, procaine, N-ethylpiperidine, dibenzylamine, N-benzyl-phenethylamine, 1 - ephenamine, N,N' - dibenzylethylenediamine, dihydroabietylamine and other salt forming amines are useful as therapeutically applied penicillanic acid derivatives.

British Pat. No. 1,004,670, South African Pat. No. 67/6472, the Belgian Pats. Nos. 695,859 (U.S. Pat. No. 3,551,094), 695,851 (U.S. Pat. No. 3,574,189) and 768,548 (U.S. Pat. No. 3,574,189) relate to the preparation of compounds of this type.

The methods involve the preparation of α-carboxyl-benzylpenicillin or the derivatives thereof and the ester of α-carboxy-benzylpenicillin is obtained in all cases in aqueous medium from malonic chloride containing on the carboxyl group a protecting ester group and from 6-APA. The various methods differ in the removal of the ester group performed either hydrogenolytically (in the case of the benzyl ester) or by mildly alkaline hydrolysis under various conditions, when the free carboxyl group is obtained.

It appears from the described procedures that average yield varies between 30 and 35 percent for 6-APA. The α-carboxy-benzylpenicillin obtained in this manner is subjected to further purification, the yield of which will fluctuate between 70 and 75 percent.

According to the Belgian Patent Specification No. 669,198 D-(α'-carboxyl - α' - phenyl)-acetamido-benzylpenicillin is prepared by a similar method involving the hydrogenolytic splitting of the corresponding benzyl ester.

In this method the acid chloride of the semi-ester of various malonic acid derivatives is linked in an aqueous medium with α-aminobenzylpencillin sodium followed by the hydrogenolytic removal of the ester group.

The present invention involves a method for the preparation of carboxyl group containing 6-aminopenicillanic acid derivatives of the formula I

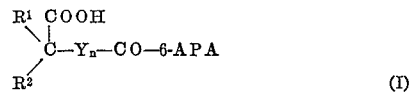

(I)

and of salts thereof, in which formula

R¹ represents hydrogen, or a alkyl, aryl, aralkyl, aryloxy or heterocyclic group;
R² represents hydrogen, or a alkyl, aryl, or aralkyl group and
Y represents a valence bond or a

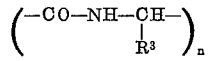

where R³ is a hydrogen, or a alkyl, aryl, aralkyl, aryloxy or heterocyclic group and n is an integer, by hydrolyzing compounds of the formula II

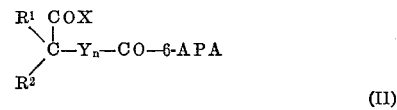

(II)

or the salts or esters thereof with water and/or with a weak base—where the meaning of R¹, R², Y and n and of 6-APA is the same as stated above and X stands for a halogen atom.

The groups R¹, R² and R³ may also be present in some substituted form. The substituents can be halogen, alkyl, alkoxy, amino or nitro groups.

In a preferred embodiment of our method the salt of the chlorocarbonyl-6-APA derivative of the general formula II is hydrolyzed in a weak alkaline medium, e.g. with alkali hydrogen carbonate, alkali borate or dilute alkali solution at pH 7 to 7.5, whereupon the dialkali salt of the formed dicarboxylic acid passes from the organic phase into the aqueous phase.

Compounds having the general formula II are prepared by reacting a salt, e.g. the triethylamine salt, or an ester, e.g. the trimethylsilane ester, of 6-APA in the presence of a weak base—e.g. N,N'-dimethylaniline or pyridine—in a hydroxy-free organic solvent—e.g. in methylene chloride, chloroform, or dichloroethane—with malonyl dihalogenide having the formula III

(III)

where the meaning of R¹, R² and X are the same as above (see Hungarian Patent Application Nos. CI-1,006 (Hungarian Pat. No. 161,609) and CI-980).

Since we prefer to preclude the preparation of the chlorocarbonyl-6-APA derivative from the reaction mixture, it is expedient to remove any nonreacted phenyl-malonyl dihalogenide derivative from the mixture.

According to our observations, phenylmalonyl dichloride reacts at 0° C. with benzylalcohol in the presence of an acid-binding agent leading to the dibenzyl ester, while the chlorocarbonyl-6-APA derivative does not react at this temperature with benzylalcohol. After the hydrolysis the dibenzyl ester formed in this way remains in the organic phase and does not contaminate the final product.

It is advisable to perform the hydrolysis at a temperature between —5° and +5° C. with potassium or sodium hydroxide or hydrogen carbonate so that the pH value lies between 7 and 7.5.

The pure crystalline dialkali salts can be prepared by the following method:

After hydrolysis the obtained aqueous solution having a pH value between 7 and 7.5 and containing approximately 10 percent of the dicarboxylic potassium salt is extracted with a suitable, water immiscible solvent, e.g. an alcohol such as butanol, or with ethylacetate or methyl-iso-butyl ketone. The separated aqueous solution is again covered by one of the above solvents, preferably with butanol and the pH value of the aqueous solution adjusted to 2–2.5 by means of a 10 percent hydrochloric acid solution.

The organic phase containing about 10 percent of dicarboxylic acid is separated from the aqueous phase. The aqueous phase is extracted two more times with one of the above solvents and the combined organic phases are extracted with a saturated salt solution.

The separated organic phase is dried over magnesium sulphate, filtered and neutralized with triethylamine or N-ethylpiperidine or some other organic base. In this way the solution will contain about 3 to 20 percent of water which is removed by azeotropic distillation.

The solution of about 15 percent concentration, obtained in this manner, is mixed with an equal volume of dry acetone and an alkali salt semicolon, preferably sodium diethylacetate dissolved in anhydrous ethanol at 0° to +5° C. to give a 40 percent solution, is added dropwise to the solution. The precipitated dialkali salt is filtered, washed with acetone and dried under vacuum.

By the method described in our invention the dicarboxylic acids are obtained from the corresponding carbonyl-6-APA derivatives with a good yield and in high purity. Preparation of the dicarboxylic acids in accordance with the method described in the present invention differs from the hitherto known methods (Belgian Patent Specifications Nos. 768,497 and 804,275) which specify the reaction of the free dicarboxylic acid. Our method has the advantage of the removal of the traces of water from the organic phase by means of azeotropic distillation, so that at the given pH value the substance undergoes no decomposition. It is, for instance known that free $\alpha$-dicarboxylic acids are readily dicarboxylated even at room temperature (Brit. Med. J., p. 75, 1967).

It is a further advantage of our method that because of distillation the dicarboxylic salt is present in a higher concentration and because of the removal of water the quantity of acetone can also be reduced. The di-sodium salt precipitated in this manner does not liquify in on air and is only moderately hygroscopic, while the salt precipitated from aqueous butanol according to the hitherto known methods liquifies on air depending on the water content of butanol and the salt is therefore difficult to filter.

The processing method described above is more economical and requires considerably less solvent, that is to say a smaller apparatus can be used than in the earlier-described purification methods.

This step in our method is in itself a novelty and may be applied in preparation methods which deviate from the principal techniques of our present application.

According to an advantageous embodiment of our method we may use as starting material carboxylic halogenides having the formula IV,

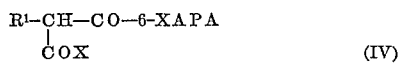

preferably carboxylic chloride. By reacting this compound with water and/or alkali, the penicillin derivative known under the name of carbenicillin, i.e. the alkali salt thereof can be prepared. Another advantageous embodiment of our method involves the reaction of carbohalogenides having the formula V

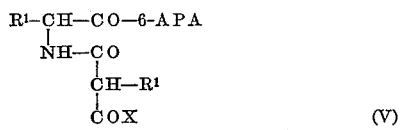

(where X represents a halogen atom, and $R^1$ an alkyl, aralkyl, aryl or a heterocyclic group) with water and/or alkali. According to an advantageous variation of this method compounds having the formula VI

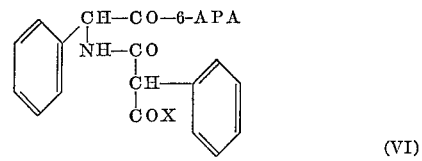

in which formula the meaning of X is the same as above, or an ester or salt thereof may also be used as starting materials.

The following examples serve to illustrate our invention.

EXAMPLE 1

To a suspension of 6.5 g. (0.03 mol.) of 6-APA in 70 ml. of methylene chloride 8.4 ml. (0.06 mol) of triethylamine is added under constant stirring and stirring is continued at room temperature till the substance has gone into solution, then at 0° C. 3.5 g. (0.03 mol) of pyridine chlorohydrate and 2.5 ml. (0.03 mol) pyridine dissolved in 30 ml. of methylene chloride are added. The solution is then cooled to −30° C. and 6.5 g. (0.03 mol) of phenylmalonyl dichloride dissolved in 50 ml. of methylene chloride is added dropwise to the mixture. The reaction mixture is kept at a temperature between −30° and −25° C. for 60 minutes and at 0° C. for a further 60 minutes. The reaction mixture will then contain $\alpha$-chlorocarbonyl-benzylpenicillin. The reaction mixture is then agitated at 0° C. for one hour after which the mixture of 10 ml. of benzylalcohol and 10 ml. of pyridine is added. The temperature is now raised to 5° C. and the reaction mixture kept at this temperature for one hour. Now a 20 percent aqueous potassium hydrogen carbonate solution is added to the reaction mixture at 0° C., so that the pH value shall be between 7 and 7.5 and this is followed by stirring at a temperature between 0° and +5° C. for one hour.

The phases are separated and the aqueous phase extracted with 50 ml. of methylene chloride. The separated aqueous phase is covered with 100 ml. of butanol and the pH value of the mixture adjusted to 1.8–2 at 0° C. by means of a 20 percent aqueous hydrochloric acid solution. The two phases are again separated and after extraction of the aqueous phase with twice 30 ml. of butanol the united butanolic solutions are dried over magnesium sulphate (50 g.), filtered and the pH of the solution adjusted to 7–7.5 by means of triethylamine, and half of the volume of butanol removed by distillation at 20–25° C. Now 100 ml. of acetone is added to the residue and the pH value adjusted to 7–7.5 by the addition of a 40 percent solution of sodium diethylacetate in butanol under vigorous agitation when 7 g. of $\alpha$-carboxy-benzylpenicillin disodium separates in a crystalline form which is easy to filter. Iodometric titration confirmed the 92% purity of the product; its infra-red spectrum contained characteristic bands at 1600 and 1750 $\mu$m.

EXAMPLE 2

7 g. of $\alpha$-amino-benzylpencillin is suspended in 70 ml. of methylene chloride, 5.6 ml. of triethylamine is added and the mixture stirred at room temperature till a clear solution is obtained. Now 2.4 g. of pyridine hydrate and 1.8 ml. of pyridine dissolved in 20 ml. of dichloromethane are added at 0° C. This is followed by the addition of 4.5 g. of phenylmalonyl dichloride dissolved in 40 ml. of methylene chloride at −20° C. The reaction mixture is kept at −20° C. for one hour and for another hour at 0° C. The reaction mixture contains $\alpha$-($\alpha'$-phenyl-$\alpha'$-chloro-carbonyl) - acetamido - benzylpenicillin in the presence of a small quantity of unreacted phenylmalonyl dichloride.

Now the mixture of 7 ml. of benzylalcohol and 4 ml. of pyridine is added to the reaction mixture which is then stirred at +10° C. for one hour. The pH value of the solution is then adjusted to 1.5–2 by means of a 2N hydrochloric acid solution. The product separates in the form of a yellowish white amorphous powder. The product is 5 g. of α-(α'-phenyl-α'-carboxy)-acetamido-benzylpenicillin. M.P. 110–120° C. (decomposes), nitrogen, percent=8.0 (theoretical value 8.2). The obtained dicarboxylic acid can be converted into the disodium salt by treatment with a 5 percent solution of sodium hydrogencarbonate.

The disodium salt can be prepared by the method described in Example 1. Thus the free dicarboxylic acid separated from the reaction mixture by filtration is dissolved in butanol and the procedure is then the same as in Example 1. A crystalline disodium salt of high purity is obtained which is easy to filter. Iodometric titration shows that the purity of the product corresponds to 90 percent.

EXAMPLE 3

4.5 g. (0.02 mol) of 6-APA is suspended in 50 ml. of methylene chloride and 5.6 ml. (0.04 mol) of triethylamine is added. The reaction mixture is stirred at room temperature, cooled to 0° C. and a solution of 2.4 g. (0.02 mol) of pyridine chlorohydrate and 1.8 ml. of pyridine in 20 ml. of methylene chloride is added to the solution. The mixture is cooled to −30° C. and the solution of 5.0 g. (0.02 mol) of p-chlorophenylmalonyl dichloride in 50 ml. of methylene chloride is added to the reaction mixture. The initially red colour of the solution disappears within 30 minutes. Stirring is continued for another 30 minutes at a temperature between −10 and −5° after which the acid chloride is treated at 0° C. with a 20 percent aqueous solution of $KHCO_3$. The layers are separated, the $KHCO_3$ solution is covered with ethylacetate and acidified at 0° C. with hydrochloric acid. The ethylacetate layer is separated from the aqueous layer and then the ethylacetate layer is extracted with a saturated sodium chloride solution. After evaporation of the aqueous phase 4 g. of α-carboxy-p-chlorobenzylpenicillin disodium is obtained.

The disodium salt can be prepared from the ethylacetate solution by drying over magnesium sulphate, filtration and adjustment of the pH value to 7–7.5 by means of triethylamine followed by the evaporation of the solution to half of its initial volume under the conditions described in Example 1 and precipitation of the sodium salt by means of a mixture of acetone with sodium diethylacetate, filtration and washing with acetone. Analysis (percent): N=6.0; Cl=7.3 (theoretical values 6.0 and 7.5% respectively). Iodometric titration shows the preparation having a purity of 92 percent.

EXAMPLE 4

7.0 g. (0.02 mol) of α-amino-benzylpenicillin is suspended in 70 ml. of methylene chloride and 5.6 ml. (0.04 mol) of triethylamine is added. The mixture is stirred at room temperature till the substance is completely dissolved, then cooled to 0° C. and a solution of 2.4 g. (0.02 mol) of pyridine chlorohydrate and 1.8 ml. (0.02 mol) of pyridine in 20 ml. of dichloromethane is added. The mixture is cooled to −30° C. and at this temperature the solution of 5.0 g. (0.02 mol) of p-chlorophenylmalonyl dichloride in 50 ml. of methylene chloride is added dropwise. The acid chloride is decomposed at 0° C. with 2 N hydrochloric acid one hour later. The yellow crystalline substance is removed by filtration, washed thoroughly with distilled water and dried. The product is 8.5 g. of α-([α'-carboxy]-α'-[p-chlorophenyl])-acetamidobenzylpenicillin.

The dicarboxylic acid obtained in this manner is dissolved in ethylacetate, the disodium salt extracted with sodium hydrogen carbonate and after the separation and evaporation of the aqueous phase 7.5 g. of α-([α'-carboxy]-α'-[p - chlorophenyl]) - acetamidobenzylpenicillin disodium is obtained.

Analysis (percent): N=6.9; Cl=5.8 (theoretical values 7.1 and 6.0%, respectively).

Iodometric titration has shown the substance to have an 80 percent purity.

EXAMPLE 5

The triethylamine salt of α-chlorocarbonyl-chlorobenzylpenicillin in methylene chloride solution is prepared from 4.5 g. (0.02 mol) of 6-APA and 5.0 g. (0.02 mol) of o-chlorophenylmalonyl dichloride by the procedure described in Example 3. Proceeding in the same way as described in Example 3 the disodium salt of α-carboxy-o-chlorobenzylpenicillin is obtained.

Analysis (percent): N=6.0; Cl=7.3 (theoretical values 6.0 and 7.5% respectively).

EXAMPLE 6

The triethylamine salt of α-([α'-chlorocarbonyl]-α'-[o-chlorophenyl])-acetamido - benzylpenicillin in methylene chloride solution is prepared from 7.0 g. (0.02 mol) of α-aminobenzylpenicillin and 5.0 g. (0.02 mol) of o-chlorophenylmalonyl dichloride by the procedure described in Example 4. Preparing the final product in conformity with Example 4 the disodium salt of α-([α-carboxyl]-α'-[o-chlorophenyl])-acetamido-benzylpenicillin is obtained.

Analysis (percent): N=6.8; Cl=5.6 (theoretical values 7.1 and 6.0%, respectively).

EXAMPLE 7

22 g. (0.05 mol) of the disodium salt of α-carboxybenzylpenicillin is dissolved at +5° C. in 220 ml. of water and the pH of the solution adjusted to 7–7.5 by means of a saturated solution of sodium carbonate. The solution is extracted with twice 100 ml. of butanol, the aqueous portion covered with 250 ml. of butanol, cooled to 0° C. and acidified with hydrochloric acid so that the pH shall be 2. The layers are separated and the aqueous portion extracted two more times with 50 ml. of butanol. The united butanol solutions are washed with 100 ml. of a saturated sodium chloride solution, the butanol layer separated, dried over magnesium sulphate, filtered and the pH adjusted at 0° C. to 7–7.5 by means of triethylamine. The solution is heated under high vacuum to 25° C. when 150 ml. of butanol is removed by distillation together with any residual moisture. The remaining solution of about 200 ml. is mixed with 200 ml. of acetone and cooled to a temperature between 0° and +5° C. The solution of 14 g. of sodium diethylacetate in 20 ml. of anhydrous ethanol is added. Stirring is continued for another 90 minutes, then the crystalline sodium salt of α-carboxybenzylpenicillin is washed with 50 ml. of dry acetone and dried under vacuum over $P_2O_5$. The yield is 80%. According to iodometric titration the purity of the preparation is 92%. The end product is 17.5 g. of pure α-carboxy - benzylpenicillin disodium salt (the disodium salt of [α' - carboxyl-α'-phenyl]-acetamido-benzylpenicillin).

EXAMPLE 8

By applying the method described in the foregoing examples the pure disodium salt of α-([α'-carboxy]-α'-[o-chlorophenyl]-acetamido-benzylpenicillin is obtained after reprecipitation in a 78% yield.

Iodometric titration indicates that the product has a 92 percent purity.

What we claim is:

1. A process for the preparation of a compound selected from the group which consists of:

α-carboxy-benzylpenicillin,
α-(α'-phenyl-α'-carboxy-acetamido-benzylpenicillin,
α-carboxy-p-chloro-benzylpenicillin,
α-carboxy-o-chloro-benzylpenicillin,
α-([α'-carboxy]-α'-[p-chlorophenyl])-acetamido-benzylpenicillin, and
α-([α'-carboxy-α'-chlorophenyl])-acetamido-benzylpenicillin and salts thereof which comprises the step of hydrolyzing a corresponding compound selected from the group which consists of:

α-chlorocarbonyl-benzylpenicillin,
α-(α'-phenyl-α'-chlorocarbonyl-acetamido-benzylpenicillin,
α-chlorocarbonyl-p-chloro-benzylpenicillin,
α-chlorocarbonyl-o-chloro-benzylpenicillin,
α-([α'-chlorocarbonyl]-α'-[p-chlorophenyl])-acetamido-benzylpenicillin, and
α-([α'-chlorocarbonyl]-α'-[o-chlorophenyl])-acetamido-benzylpenicillin with water and/or a weak base selected from the group which consists of the hydrogen carbonate, hydroxide and borate of sodium or potassium, at a pH of 7 to 7.5 and at a temperature of −10° C. to +5° C.

2. The process defined in claim 1 wherein the hydrolyzed compound is prepared by reacting phenylmalonyl dichloride, orthochlorophenylmalonyl dichloride or parachlorophenylmalonyl dichloride with the triethylamine salt or the trimethylxylene ester of 6-APA in the presence of dimethylaniline or pyridine in an anhydrous medium selected from the group which consists of methylene chloride, chloroform or dichloroethane.

3. The process defined in claim 2 wherein the hydrolysis is effected directly in said medium without isolation of the hydrolyzed compound.

4. The process defined in claim 3 wherein excess phenylmalonyl dichloride is esterified with benzyl alcohols.

5. The process defined in claim 1, further comprising the steps of treating the hydrolysis product with a butanolic solution to convert it into a free dicarboxylic acid, reacting said free dicarboxylic acid with a trialkyl amine to produce a salt, azeotropically distilling water from the system containing the latter salt, and treating the latter with an alkali salt of diethylacetic acid to precipitate the corresponding dialkali salt of the hydrolysis product.

6. The process defined in claim 5 wherein the alkali salt of diethylacetic acid is sodium diethylacetate, further comprising the step of adding acetone to the system subsequent to azeotropic distillation.

References Cited

UNITED STATES PATENTS

| | | | |
|---|---|---|---|
| 3,282,926 | 11/1966 | Brain et al. | 260—239.1 |
| 3,574,189 | 4/1971 | Butler | 260—239.1 |
| 3,641,001 | 2/1972 | Love et al. | 260—239.1 |

NICHOLAS S. RIZZO, Primary Examiner

U.S. Cl. X.R.

424—271